United States Patent [19]

Bistrick et al.

[11] 4,274,767
[45] Jun. 23, 1981

[54] HELICAL TOOTHED BROACH

[75] Inventors: Eugene J. Bistrick; Axel B. Abrahamsson, both of Warren, Mich.

[73] Assignee: Lear Siegler, Inc., Santa Monica, Calif.

[21] Appl. No.: 102,119

[22] Filed: Dec. 10, 1979

[51] Int. Cl.³ .............................................. B26D 1/00
[52] U.S. Cl. ..................................................... 407/18
[58] Field of Search ............................ 407/17, 18, 16

[56] References Cited

U.S. PATENT DOCUMENTS

| 2,986,801 | 6/1961 | Mentley | 407/18 |
| 3,276,100 | 10/1966 | Pseuka | 407/18 |

Primary Examiner—Harrison L. Hinson
Attorney, Agent, or Firm—Whittemore, Hulbert & Belknap

[57] ABSTRACT

A finishing broach for a work piece having helical teeth in which an elongated broach body has a multiplicity of series of helically aligned teeth and in which each tooth has sides conforming to the profile shape of the tooth spaces between adjacent teeth on the work piece, and in which the sides of each tooth are inclined to define obtuse and acute included angles at the leading corners. Each series of broach teeth has a leading and a following section. In the leading section at the acute side the teeth are all laterally stepped and backed off. At the obtuse side the teeth are neither laterally stepped nor backed off. In the following section at the obtuse side the teeth are all laterally stepped and backed off. In the following section at the acute side the first few teeth are backed off but are not laterally stepped. The following tooth is neither laterally stepped nor backed off but its side surface is chamfered from the front surface of the tooth rearwardly. The remaining teeth in the following section at the acute side are neither stepped nor backed off.

9 Claims, 2 Drawing Figures

HELICAL TOOTHED BROACH

BACKGROUND AND SUMMARY OF THE INVENTION

Broaching of work pieces having helical teeth by broaches designed to finish cut the sides of the teeth is well known.

In prior U.S. Pat. No. 2,987,801 there is disclosed a roughing broach, having a floating shell mounted on its trailing portion. The floating shell has laterally stepped teeth which perform a side shaving operation. The disclosure suggests that both spur and helical work pieces can be produced.

While theoretically the structure disclosed in U.S. Pat. No. 2,987,801 would produce accurate helically toothed work pieces, it was found that when producing helically toothed work pieces, errors appeared in lead, or as tooth distortions, due largely to the fact that with helical broach teeth, the cutting action and guiding action is different at the sides forming acute and obtuse included angles with the front tooth surface. This led to further developments, and U.S. Pat. No. 3,276,100 disclosed a finishing shell specifically modified for broaching helical teeth, in which a series of helically aligned broach teeth was divided into leading and following groups, each group of teeth being non-cutting on one side and cutting only on the other with the relationship reversed in the two sections.

This represented a substantial advance in the art, but as ever higher standards of accuracy were imposed, it became apparent that further refinements were required. Other variations as disclosed in U.S. Pat. Nos. 3,178,800, 3,199,172, 3,217,383, 3,231,962, 3,267,552 and 3,276,099, were used and in particular cases solved special problems. However, no single broach design was found in all cases to produce the highly accurate helical teeth required by present technology.

The present invention relates to an improvement over prior U.S. Pat. No. 3,276,100 which improvement in production broaches has proved to eliminate errors previously requiring in many cases specific special modifications to overcome specific tooth errors.

In accordance with the present invention, a finishing broach or broach section for broaching helical teeth has a multiplicity of series of helically aligned teeth. All of the teeth have generally helically inclined sides which intersect the front faces to provide acute and obtuse included angles at opposite sides of the teeth. Also all of the teeth are shaped to conform to the profile of the tooth space in which they operate.

The teeth of each series are divided generally into a leading section and a following section.

All of the teeth in the leading section at the acute included angle sides thereof are laterally stepped and backed off to take a progression of shaving cuts on the adjacent tooth surface for the full tooth height. In this leading section, the teeth at the obtuse side have neither backoff nor lateral stepping.

The teeth of the following section at the obtuse side are laterally stepped and backed off throughout. At the acute side of the teeth in the trailing section, the first few teeth are not stepped laterally, but are backed off. Following these few teeth there is provided a single tooth which at the acute side is neither stepped nor backed off, but is provided with a side chamfer extending from its front face rearwardly. Following this single tooth the remaining teeth in the trailing section at the acute side are neither stepped nor backed off.

DETAILED DESCRIPTION

Figure 1:
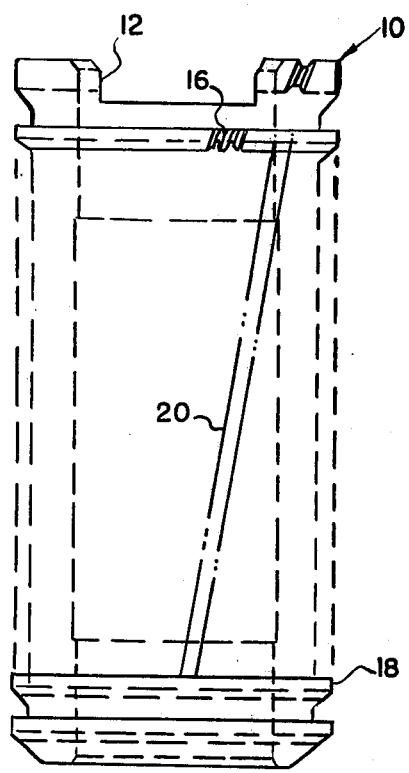
FIG. 1 is an elevational view of a finishing shell incorporating the present invention.

In FIG. 1 there is shown a finishing shell 10 which is adapted to be supported on the trailing end of a roughing broach, as well illustrated in prior U.S. Pat. No. 2,987,801.

For this purpose there is provided a cylindrical support portion at the trailing end of the broach, and the shell 10 has a generally cylindrical axially extending opening, which interfits closely over the support portion while permitting limited rotation thereon. The roughing broach has a multiplicity of series of helically inclined teeth of progressively increasing height, so that when the roughing teeth have passed through a work piece, the work piece is provided with a like multiplicity of helical teeth, which however are wider, of slightly greater circumferential extent than desired.

The shell 10 is formed with locating spaces 12 at its leading end which position the shell on the support with its teeth in at least substantial helical alignment with the teeth on the roughing broach. In practice the shell is supported by abutment means at its trailing end which permits limited rotation of the shell to provide for precise alignment of teeth.

Figure 2:
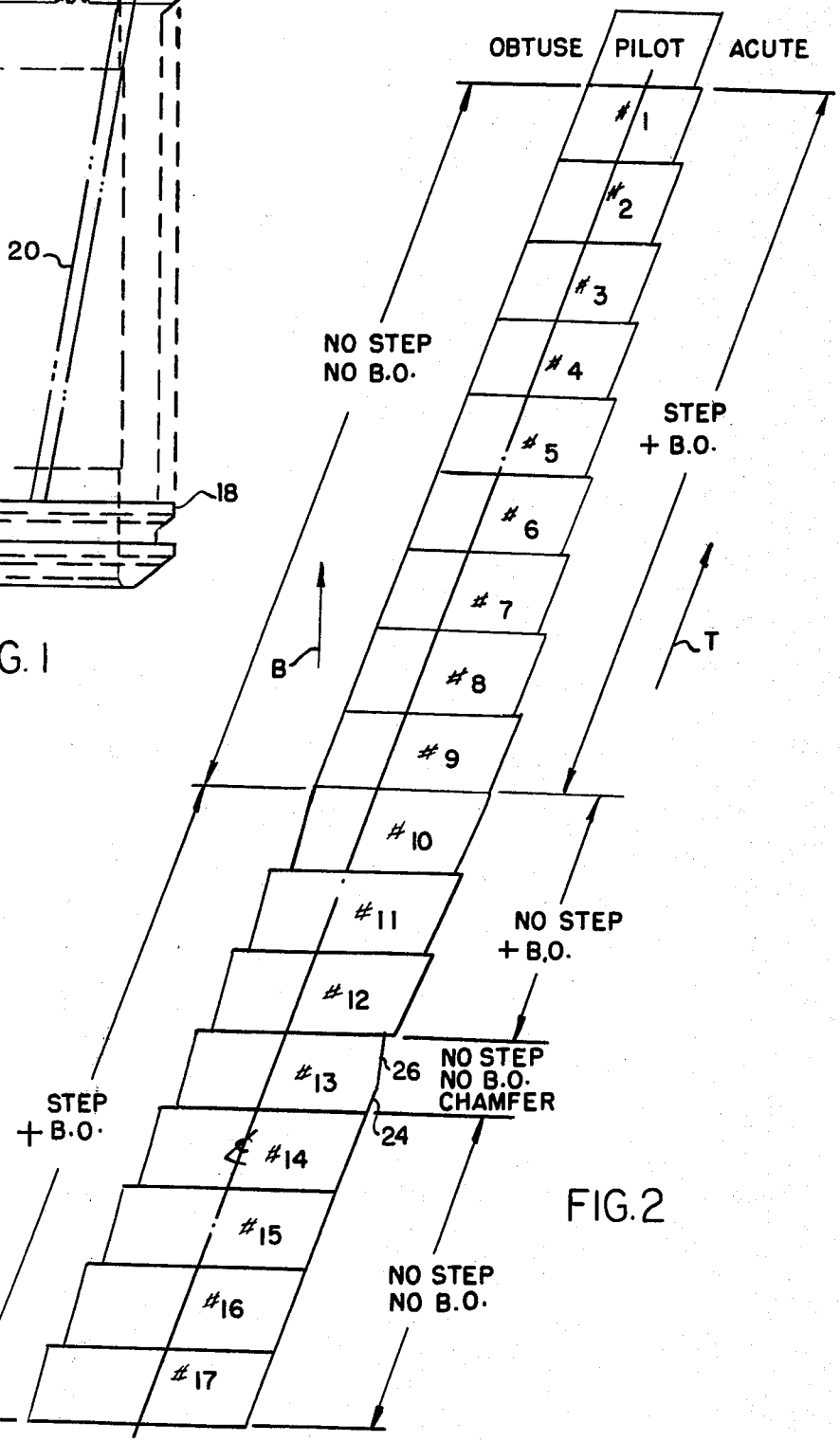
FIG. 2 is a diagrammatic view illustrating the variation in sequential teeth.

The leading tooth of each series on the shell is a pilot tooth which as indicated on diagrammatic FIG. 2 has its side surfaces extending at the helix angle of the part, and not backed off. The leading ends of these pilot teeth may if desired be chamferred to facilitate entry into the spaces between the rough cut teeth of the work piece and guide the shell with its teeth in precise helical alignment.

The finish cutting teeth are arranged in circumferentially extending groups, and in helically aligned series such as indicated at 20. As a result of the helical arrangement, each tooth has its side surfaces intersecting its front surface at obtuse and acute included angles.

In this figure arrow T indicates the direction of movement of a series of the broach teeth in tooth space of the work, and the arrow B indicates the direction of movement of the broach parallel to its axis.

It has been found that the torque established by simultaneous cutting on both acute and obtuse included angle cutting edges tends to cause the obtuse included angle cutting edge to cut deeper than at the acute side. This led to the earlier design disclosed in prior U.S. Pat. No. 3,276,100, referred to above. However, in some cases tooth errors appeared. It is theorized that some of the errors may be attributed to the releasing of the cutting pressures on the obtuse side of the cutting teeth as the final broach teeth begin to leave the part or work piece.

Diagrammatic FIG. 2, in which the teeth are labeled in sequence from #1 to #17 illustrates the specific modification which has produced a substantial improvement in helical tooth broaching.

It is assumed that the pilot teeth are dimensioned to fit accurately in the tooth spaces as previously formed in the work piece by rough broaching, or otherwise. If desired the leading sides of the pilot teeth may be chamfered to enter the tooth spaces if slight helical misalignment of the finishing broach is present.

The broach as illustrated in the specific example of FIG. 2 has seventeen teeth following the pilot tooth of each series. These teeth for convenience may be regarded as divided into two sections, a leading section constituted by teeth #1–#9, and a following section, constituted by teeth #10–#17.

At the obtuse side, teeth #1–#9 are neither laterally stepped nor backed off but together constitute an effectively continuous guiding surface, so the teeth pass through the tooth spaces of the work piece at precisely the required helix angle. Accordingly, the successive cutting edges at the acute side each takes a cut at a width determined by the amount of lateral stepping, and for substantially the full height of the tooth, a cut which is referred to as a full form finishing. When tooth #9 passes through the work piece the sides of the teeth cut by the acute included angle cutting edge have been precision cut to size.

As the series of teeth in the following section, constituted by teeth #10–#17, enters the work piece, the laterally stepped and backed off cutting edges at the obtuse included angle side thereof provide a full form finishing series of cuts to a width determined substantially by the total amount of lateral stepping of teeth #10–#17. As this series of cuts is initiated, guiding action is transferred to the acute included angle side of the broach teeth.

However, the first few teeth, here graphically illustrated at teeth #10–#12, are backed off, although not laterally stepped. Thus the intersection between the sides and the front faces of these teeth are cutting edges, and as the laterally stepped and backed off cutting edges at the obtuse side initiate their successive full form finishing cuts, the cutting edges at the acute angle side of teeth #10–#12, while not stepped, will insure a final finishing of the adjacent sides of the work piece teeth, and will leave these sides extending at precisely the required lead or helix angle and smoothly finish cut to precisely the required form or profile.

Following tooth #12 is a tooth #13 which at the obtuse side, as previously noted, is laterally stepped and backed off. At the acute side of this tooth, the side surface is not backed off but has guide surface portion 24 which lies in the helical projection determined by the cutting edges of teeth #9–#12. However this side of tooth #13 is chamfered from the front face rearwardly as indicated at 26, the amount of such chamfer being sufficient to insure that when the broach is sharpened, no interference shoulder will ever be formed to bump against the work piece as tooth #13 enters the work piece. This chamfer will also insure that as the remaining cutting teeth #14–#17 enter and pass through the work piece, the effectively continuous unrelieved or unbacked-off surfaces at the acute sides of these teeth are accurately located to constitute in effect a true helical extension of the surface traversed by the front acute included angles of teeth #9–#12.

This arrangement of teeth provides in general that the helical teeth of the work piece are full form finish cut first on the side thereof cut by the acute included angle cutting edges of the broach teeth, and then by the obtuse included angle cutting edges thereof, with a smooth transition between the two series of cuts, and with provision for regrinding the broach teeth to sharpen the cutting edges.

The foregoing description sets out some theoretical concepts offered as possible explanations of why the defined arrangement operates successfully, but in the final analysis, the broach represents the culmination of decades of experience in designing and modifying helical broaches, and is in that sense empirical. It does however disclose a series of helical broach teeth which has been adopted as standard.

Of course the number of teeth in the finishing broach may vary, being as few as possible to obtain accurate cutting and removal of defects attributable to rough cutting.

The amount of back off is as conventionally provided, for example about ½°. The amount of stepping may vary, and is ordinarily uniform through the leading cutting edges in each section. The lateral stepping in the following cutting edges in each section may be of somewhat reduced amount.

The tooth profiles as cut may have whatever shape desired, an involute shape being usual in gears and splines.

While the illustrated broach has external teeth for forming counterpart internal teeth in the work piece, the same sequence of teeth may be provided in a pot broach for forming teeth on an external gear or spline.

Also the finishing broach may be on a floating shell as described in the foregoing or it may be formed by appropriately shaping the final sequence of teeth on an integral or unitary broach.

We claim:

1. A finishing broach for finish cutting helical teeth of a work piece, comprising an elongated broach body having a multiplicity of series of helically aligned teeth arranged to finish cut previously formed teeth on a work piece, all of said teeth having side surfaces conforming to the profile shape of the spaces between adjacent teeth on the work piece, each tooth having side surfaces helically inclined to the longitudinal axis of the body to define obtuse and acute included angles with its front face;

the leading section of said broach having teeth which at the acute included angle side thereof have cutting edges which are progressively stepped laterally and backed off to take sequential cuts for substantially the full height of the adjacent sides of the work piece teeth, the teeth of said leading section at the obtuse included angle sides thereof being neither laterally stepped nor backed off and which therefore provide guide surfaces in true helical alignment which cooperate with the adjacent side surfaces of the work piece teeth, the following section of said broach having teeth all of which at the obtuse included angle side thereof are laterally stepped and backed off to take sequential cuts for substantially the full height of the adjacent sides of the work piece teeth, the teeth of the following broach section at the acute included angle side thereof comprising in sequence a first few teeth which are not laterally stepped but in which the side surfaces are backed off, a single following tooth which at its acute included angle side is neither laterally stepped nor backed off, but has its side surface substantially chamfered rearwardly from its front surface, the remaining teeth of said following section at the acute included angle side thereof being neither laterally stepped nor backed off to provide guide surfaces in true helical alignment which cooperate with the adjacent side surfaces of the work piece teeth.

2. A broach as defined in claim 1, in which the chamfer of said single tooth is such as to displace the corner formed by the intersection of its front and side surfaces inwardly by several thousandths of an inch to preserve the chamfer during resharpening.

3. A broach as defined in claim 2, in which the inward displacement of the corner is 0.007–0.010 inches.

4. A broach as defined in claim 1, in which the number of laterally stepped and backed off teeth at the acute and obtuse included angle sides thereof is approximately equal.

5. A broach as defined in claim 1, in which the number of teeth preceding the chamfered tooth which at the acute included angle side are backed off but not stepped is 2–4.

6. A broach as defined in any preceding claim in which the teeth are formed on the exterior of the broach body.

7. A broach as defined in claims 1, 2, 3 or 4, in which the finishing broach is in the form of a tubular shell mounted on the trailing end of a roughing broach with the roughing broach and finishing broach having helically aligned series of teeth, in which the roughing broach cuts the work piece teeth to full depth, and the finishing broach finish cuts the sides of the work piece teeth.

8. A broach as defined in claim 1 in which the number of teeth designed to cut at the acute included angle side exceeds the number designed to cut at the other side.

9. A broach as defined in claim 1 in which the broach is a pot broach of generally tubular form having its teeth at the interior thereof.

* * * * *